(12) United States Patent
Bernardon

(10) Patent No.: US 6,801,024 B2
(45) Date of Patent: Oct. 5, 2004

(54) METHOD OF FREQUENCY LIMITATION AND OVERLOAD DETECTION IN A VOLTAGE REGULATOR

(75) Inventor: Derek Bernardon, Villach (AT)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/455,153

(22) Filed: Jun. 5, 2003

(65) Prior Publication Data

US 2003/0214276 A1 Nov. 20, 2003

Related U.S. Application Data

(63) Continuation of application No. PCT/EP01/11528, filed on Oct. 5, 2001.

(30) Foreign Application Priority Data

Dec. 5, 2000 (EP) ............................................. 00126730

(51) Int. Cl.$^7$ .............................................. G05F 1/613
(52) U.S. Cl. ...................................... 323/224; 323/283
(58) Field of Search ................................ 323/224, 283, 323/282, 271, 268, 284

(56) References Cited

U.S. PATENT DOCUMENTS

| 4,400,767 A | | 8/1983 | Fenter |
| 4,975,823 A | | 12/1990 | Rilly et al. |
| 5,568,044 A | | 10/1996 | Bittner |
| 5,592,071 A | * | 1/1997 | Brown ........................ 323/282 |
| 5,757,173 A | * | 5/1998 | Agiman ....................... 323/282 |
| 5,757,631 A | | 5/1998 | Semmler |
| 5,912,552 A | | 6/1999 | Tateishi |
| 5,945,820 A | | 8/1999 | Namgoong et al. |

FOREIGN PATENT DOCUMENTS

| EP | 1 213 822 A1 | 6/2002 |
| WO | 96/10287 | 4/1996 |

* cited by examiner

*Primary Examiner*—Shawn Riley
(74) *Attorney, Agent, or Firm*—Laurence A. Greenberg; Werner H. Stemer; Ralph E. Locher

(57) ABSTRACT

A regulated output voltage and an output current are generated by using a switching device for providing the output current and controlling the switching device with the first control circuit functioning in a pulse width modulation mode and in an alternative manner with a second control circuit functioning in a pulse frequency modulation mode. A second feedback circuit is included in the second control circuit and a time delay is introduced in the second feedback circuit in order to introduce a limitation of the pulse frequency.

9 Claims, 2 Drawing Sheets

METHOD OF FREQUENCY LIMITATION AND OVERLOAD DETECTION IN A VOLTAGE REGULATOR

CROSS-REFERENCE TO RELATED APPLICATION

This application is a continuation of copending International Application No. PCT/EP01/11528, filed Oct. 5, 2001, which designated the United States and which was published in English.

BACKGROUND OF THE INVENTION

FIELD OF THE INVENTION

The present invention relates in general to the field of voltage regulators, in particular to switching voltage regulators operating in accordance with the buck converter principle.

Electronic devices such as computer processors or other loads driven by d.c. power very often require one or more stable d.c. supply voltages for operation. In the past these d.c. supply voltages have been conventionally obtained with the aid of AC/DC converters which employ typical transformers and rectifiers as well as suitable capacitors and filters to convert an a.c. supply voltage to a determined d.c. voltage. However, the voltage requirements of electronic loads such as computer processors and logic ICs are relatively high with respect to the d.c. voltage stability. One reason is that processing circuits may process different amounts of data at various points in time which means that their workloads, and hence energy requirements, vary significantly. Such loads would benefit greatly from an adjustable and well-defined d.c. supply voltage.

There exist conventional voltage regulator circuits that provide a constant output voltage of a predetermined value by monitoring the output and using feedback to keep the output constant. In a typical pulse width modulation (PWM) regulator circuit, a square wave is provided to the control terminal of the switching device to control its ON and OFF states. Since increasing the ON time of the switching device increases the output voltage and vice versa, the output voltage may be controlled by manipulating the duty cycle of the square wave. This manipulation is accomplished by a control circuit which continually compares the output voltage to a reference voltage and adjusts the duty cycle of the square wave to maintain a constant output voltage.

U.S. Pat. No. 5,945,820 discloses a DC/DC switching regulator which converts a supplied d.c. voltage to a d.c. output voltage for driving a load using a DC/DC buck converter operated with fixed-width pulses at an instantaneous switching rate. The regulator has a feedback for computing a subsequent switching rate based on the instantaneous switching rate, an output frequency derived from output voltage by a ring oscillator and a desired frequency provided by a frequency signaling device or a frequency signaling port of the load. By altering the desired frequency the load communicates its power needs. The regulator can be used in the low-power regime and at high-power levels.

Another type of voltage regulator is described in U.S. Pat. No. 5,568,044 and WO 96/10287 to Bittner, the disclosure of which is herein incorporated by reference. That type of voltage regulator, which is also referred to as a buck converter, achieves high efficiency by automatically switching between a pulse frequency modulation (PFM) mode and a pulse-width modulation (PWM) mode. Switching between the modes of voltage regulation is accomplished by monitoring the output voltage and the output current, wherein the regulator operates in PFM mode at small output currents and in PWM mode at moderate to large output currents. PFM mode maintains a constant output voltage by forcing the switching device to skip cycles when the output voltage exceeds its nominal value. In PWM mode, a PWM signal having a variable duty cycle controls the switching device. A constant output voltage is maintained by feedback circuitry that alters the duty cycle of the PWM signal according to fluctuations in the output voltage. In a PFM mode of voltage regulation the system provides better efficiency at small output current levels than does a PWM mode driven system.

As mentioned, the PFM is a mode of the buck derived converter, which is used for very low load currents. In that mode the converter senses the output voltage with a comparator, which triggers when the output voltage is too low. It effects the turning on of the switching element, i.e. the power transistor, until the current through the inductor reaches a determined value, at which the output transistor is turned off. Therefore the frequency of the converter varies depending on the load. One of the problems that occurs in the PFM mode is when the DC/DC converter is overloaded. A further problem which is not yet solved is the switch back from the PFM mode to the PWM mode, in particular the finding of a digital signal which can switch the converter from PFM to PWM.

In most of the commercially available products, such as, for example, from Linear Technologies and Maxim, a load current sensing scheme is used to determine when to change to the PWM mode in case of an overload condition that occurs in the PFM mode.

SUMMARY OF THE INVENTION

It is accordingly an object of the invention to provide a method, performed by a voltage regulator, which addresses the above-mentioned problems and overcomes the above-mentioned disadvantages of the heretofore-known devices and methods of this general type. It is a particular object of the present invention to provide a solution to an overload condition that occurs while the device operates in the PFM mode. It is a further object of the present invention to provide for a switch from the PFM mode to the PWM mode.

With the foregoing and other objects in view there is provided, in accordance with the invention, a method performed by a voltage regulator, which comprises the steps of:

generating a regulated output voltage and an output current at an output terminal of the voltage regulator with a switching device, the switching device providing the output current and having an ON state and an OFF state;

providing a first control circuit with:
  a square wave generator outputting a square wave having a duty cycle corresponding to the regulated output voltage, the square wave generator controlling the ON and OFF states of the switching device; and
  a first feedback circuit for generating an error signal based on a difference between a voltage corresponding to the output voltage and a first reference voltage and varying a duty cycle of the square wave generator in response to the error signal to cause the output voltage to be of a predetermined voltage level;

controlling the switching device with the first control circuit in pulse width modulation mode;

providing a second control circuit with:
  a signal generator outputting a switching signal having a fixed duty cycle, the signal generator controlling the ON and OFF states of the switching device; and a second feedback circuit functioning in a pulse frequency modulation mode;

introducing a time delay in the second feedback circuit for limiting a pulse frequency; and controlling the switching device with the second control circuit and, when the switching device is switched ON or OFF, triggering the time delay and not allowing the switching device to turn ON until the time delay is OFF.

It is one primarily important aspect of the present invention that in a method performed by a voltage regulator a limitation of the pulse frequency is introduced in the PFM mode. The pulse frequency is effectively limited by introducing a time delay in the second feedback circuit of the voltage regulator, i.e. the feedback circuit of the PFM mode. Due to the time delay the pulses generated and output to the LC-filter are spread in time so that the pulse frequency is effectively limited.

The invention relates, in particular, to a method performed by voltage regulator comprising the steps of generating a regulated output voltage and an output current at an output terminal of the regulator using a switching device for providing the output current, said switching device having an ON state and an OFF state, controlling the switching device with a first control circuit functioning in a pulse width modulation (PWM) mode, said first control circuit comprising a square wave generator outputting a square wave having a duty cycle corresponding to said regulated output voltage at the output terminal, wherein the square wave generator controls the ON and OFF states of the switching device, and a first feedback circuit for generating an error signal based on a difference between a voltage corresponding to the output voltage and a first reference voltage and varying a duty cycle of the square wave generator in response to the error signal to cause the output voltage to be of a predetermined voltage level, and controlling the switching device with a second control circuit, wherein the second control circuit comprises a signal generator outputting a switching signal having a fixed duty cycle, said signal generator controlling the ON and OFF states of said switching device, and a second feedback circuit functioning in a pulse frequency modulation (PFM) mode, wherein a time delay is introduced in the second feedback circuit in order to introduce a limitation of the pulse frequency.

In accordance with an added feature of the invention, the second feedback circuit comprises a current comparator sensing the current flowing through the switching device and a first voltage comparator sensing the output voltage of the voltage regulator. The current comparator may be set such that it detects a situation in which the current exceeds a predetermined level at the rising edge of a pulse thereby effecting turn off of the switching device and turn on of the time delay, and the voltage comparator may be set such that it detects a situation in which the output voltage falls below a desired output voltage, thereby effecting turn on of the switching device.

The time delay may be introduced in such a way in the second feedback circuit that the switching device is not allowed to turn ON until the time delay is OFF.

In accordance with an additional feature of the invention, the voltage regulator also comprises a second voltage comparator which effects a switchback from the PFM mode to the PWM mode, if the output voltage falls below a desired output voltage for a predetermined amount, e.g. 60 mV. The output voltage of the regulator is sensed by the second voltage comparator and the second voltage comparator outputs a digital signal if the output voltage falls below the desired output voltage for more than the predetermined amount. This digital signal then effects the switchback from the PFM mode to the PWM mode.

In an embodiment of the voltage regulator as used in the inventive method a driver circuit may be used as the square wave generator in the PWM mode as well as the signal generator in the PFM mode.

The switching device may be comprised of a transistor, in particular of a power transistor.

Other features which are considered as characteristic for the invention are set forth in the appended claims.

Although the invention is illustrated and described herein as embodied in a voltage regulation method with frequency limitation and overload detection, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
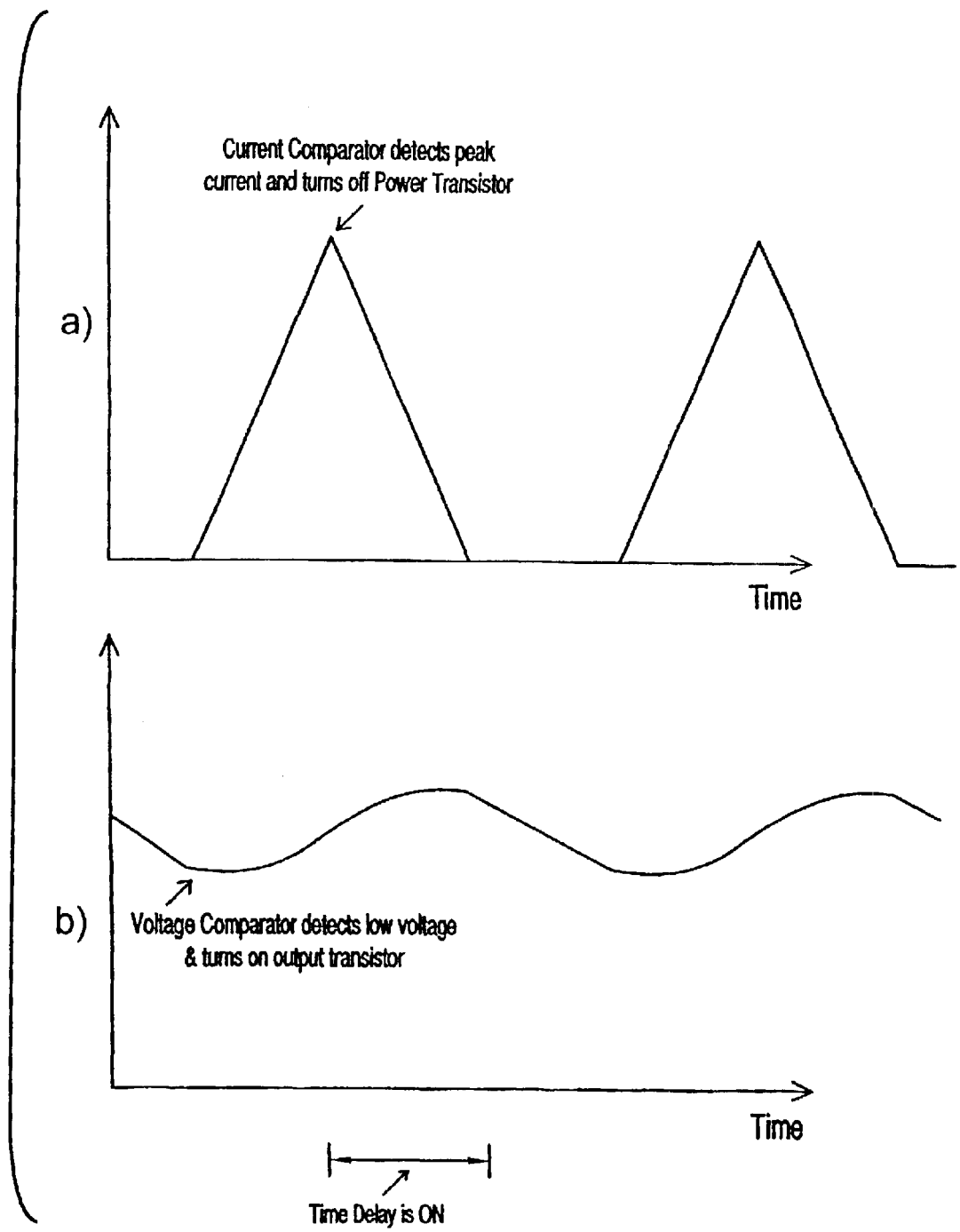
FIG. 1 is a graph plotting the time variation of the inductor current on a first timeline (a) and the output voltage on a second timeline (b), of a voltage regulator functioning according to the inventive method.

Referring now to the figures of the drawing in detail and first, particularly, to FIG. 1 thereof, the time variation of the inductor current plotted in the graph (a) and the output voltage plotted in the graph (b) of FIG. 1 illustrate an embodiment in which the time delay is triggered when the current comparator detects a so-called peak current, i.e. a predetermined current level, and turns off the switching device upon detection of the peak current. On the other hand the first voltage comparator detects a situation in which the output voltage becomes comparable to the desired output voltage and turns on the output transistor upon detection.

Figure 2:
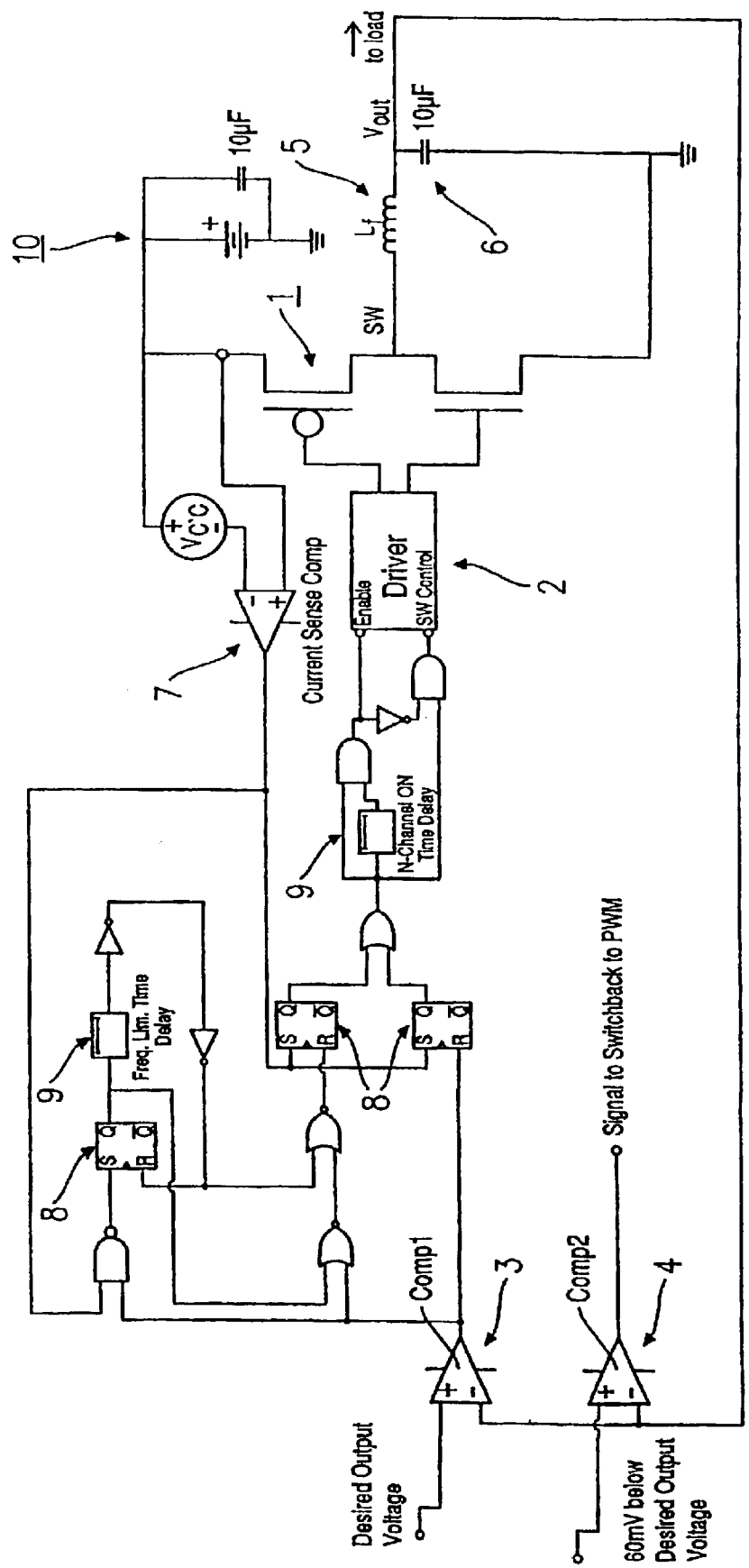
FIG. 2 is a circuit schematic of a part of a voltage regulator circuit which performs the PFM mode according to the inventive method.

The circuit schematic of FIG. 2 pertains only to that part of the voltage regulator circuit which performs the PFM mode (pulse frequency modulation). It does not include the control for the PWM mode (pulse width modulation) nor the digital control which decides when the regulator has to be in the PFM mode or in the PWM mode. For details of the buck converter switching mechanism reference is again made to U.S. Pat. No. 5,568,044 and to WO 96/10287, which are incorporated herein by reference. Several parts and devices of the depicted switching circuit are numbered and listed in the accompanying list of reference signs.

The switching device 1 is a power transistor which has an ON state and an OFF state and which is controlled by a driver 2 which functions as a signal generator in the PFM mode. The driver 2 can be shared between the PWM mode and the PFM mode. In the PWM mode it can be used as a square wave generator.

The difference with respect to the prior art lies in the introduction of a frequency limitation by introducing a time delay in the feedback circuit of the PFM mode. When the power transistor 1 is turned ON, or even better if it is turned OFF (as in FIG. 1), a time delay is triggered. If the voltage comparator triggers before the time delay turns OFF, then an overload condition occurs. It is possible to use this signal to generate the switchback to PWM. A frequency limitation may also be effected by not allowing the power transistor to turn ON until the time delay is OFF. Since the frequency is proportional to the load current, this is also a current limitation, therefore the output voltage will decrease, and another voltage comparator, such as the second voltage comparator 4, can sense this condition. The lower voltage to be sensed by the second voltage comparator 4 must of course lie within the voltage range of the specifications. This allows also possible temporary conditions where the converter in PFM mode may be overloaded for a brief period of time.

I claim:

1. A method performed by a voltage regulator, which comprises the steps of:
   generating a regulated output voltage and an output current at an output terminal of the voltage regulator with a switching device, the switching device providing the output current and having an ON state and an OFF state;
   providing a first control circuit with:
      a square wave generator outputting a square wave having a duty cycle corresponding to the regulated output voltage, the square wave generator controlling the ON and OFF states of the switching device; and
      a first feedback circuit for generating an error signal based on a difference between a voltage corresponding to the output voltage and a first reference voltage and varying a duty cycle of the square wave generator in response to the error signal to cause the output voltage to be of a predetermined voltage level;
   controlling the switching device with the first control circuit in pulse width modulation mode;
   providing a second control circuit with:
      a signal generator outputting a switching signal having a fixed duty cycle, the signal generator controlling the ON and OFF states of the switching device; and
      a second feedback circuit functioning in a pulse frequency modulation mode;
   introducing a time delay in the second feedback circuit for limiting a pulse frequency; and
   controlling the switching device with the second control circuit and, when the switching device is switched ON or OFF, triggering the time delay and not allowing the switching device to turn ON until the time delay is OFF.

2. The method according to claim 1, which comprises sensing a current flowing through the switching device with a current comparator, and sensing the output voltage with a voltage comparator.

3. The method according to claim 2, which comprises:
   setting the current comparator to detect a situation in which the current exceeds a predetermined level at a rising edge of a pulse, thereby turning OFF the switching device and turning ON the time delay; and
   setting the voltage comparator to detect a situation in which the output voltage falls below a desired output voltage, thereby turning ON the switching device.

4. The method according to claim 1, which comprises sensing the output voltage with a voltage comparator and causing a switchback from PFM mode to PWM mode when the output voltage falls below a desired output voltage.

5. The method according to claim 4, which comprises causing the voltage regulator to switch from PFM mode to PWM mode when the output voltage falls below the desired output voltage by a predetermined amount.

6. The method according to claim 5, wherein the predetermined amount is 60 mV.

7. The method according to claim 1, which comprises using the driver circuit as the square wave generator in the PWM mode and using the driver circuit as the signal generator in the PFM mode.

8. The method according to claim 1, wherein the switching device is a transistor.

9. The method according to claim 1, wherein the switching device is a power transistor.

* * * * *